US009356473B2

(12) United States Patent
Ghovanloo

(10) Patent No.: US 9,356,473 B2
(45) Date of Patent: May 31, 2016

(54) SYSTEMS AND METHODS FOR PROVIDING WIRELESS POWER TO A PORTABLE UNIT

(75) Inventor: Maysam Ghovanloo, Atlanta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 766 days.

(21) Appl. No.: 12/994,861

(22) PCT Filed: May 28, 2009

(86) PCT No.: PCT/US2009/045418
§ 371 (c)(1),
(2), (4) Date: Nov. 28, 2010

(87) PCT Pub. No.: WO2009/155030
PCT Pub. Date: Dec. 23, 2009

(65) Prior Publication Data
US 2011/0074349 A1   Mar. 31, 2011

Related U.S. Application Data

(60) Provisional application No. 61/056,589, filed on May 28, 2008.

(51) Int. Cl.
*H02J 7/00*       (2006.01)
*H02J 17/00*      (2006.01)
*H02J 5/00*       (2016.01)
*H01F 38/14*      (2006.01)

(52) U.S. Cl.
CPC ............... *H02J 17/00* (2013.01); *H02J 5/005* (2013.01); *H01F 38/14* (2013.01)

(58) Field of Classification Search
USPC ......................... 320/107, 108, 114
See application file for complete search history.

(56) References Cited

U.S. PATENT DOCUMENTS

| 5,928,143 | A  |   | 7/1999  | McNaughton |
|-----------|----|---|---------|-----------|
| 6,400,991 | B1 |   | 6/2002  | Kung |
| 2005/0075696 | A1 |   | 4/2005  | Forsberg et al. |
| 2005/0164636 | A1 | * | 7/2005  | Palermo et al. ............... 455/41.2 |
| 2006/0076922 | A1 |   | 4/2006  | Cheng et al. |
| 2007/0149261 | A1 | * | 6/2007  | Huddart ....................... 455/575.2 |
| 2007/0279002 | A1 | * | 12/2007 | Partovi ........................... 320/115 |

FOREIGN PATENT DOCUMENTS

WO      2009155030      12/2009

OTHER PUBLICATIONS

International Search Report and Written Opinion dated Jan. 12, 2011 issued by the United States Patent and Trademark Office for corresponding PCT Application No. PCT/US2009/045418.

* cited by examiner

*Primary Examiner* — Edward Tso
*Assistant Examiner* — Aaron Piggush
(74) *Attorney, Agent, or Firm* — Troutman Sanders LLP; Ryan A. Schneider; Dustin B. Weeks

(57) ABSTRACT

A wireless charging system for inductively charging and/or powering a device. The system includes a stationary base system and a moving subject. The stationary base system includes an array of primary coils that are adapted to generate a magnetic field, and a sensor system. The moving subject carries a device that includes a secondary coil that can be inductively charged and/or powered by the magnetic field emitted from the primary coil, and a magnet to be tracked by the sensor system. The moving subject can move in proximity to a surface of the stationary base system. The sensor system is adapted to communicate the location of the moving subject along the surface, wherein those coils closest to the moving subject may be activated.

18 Claims, 10 Drawing Sheets

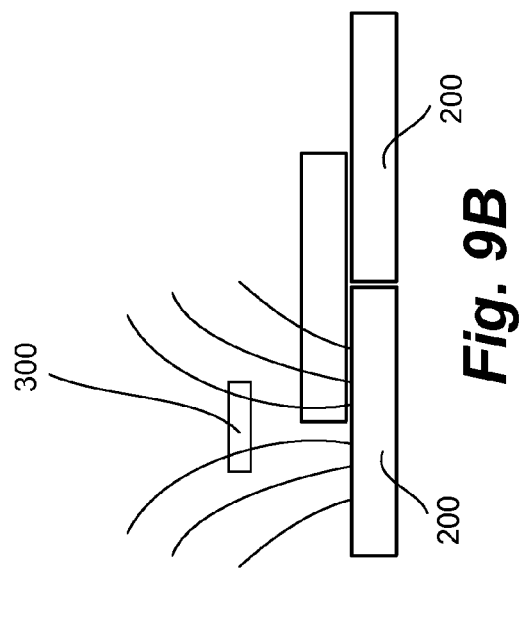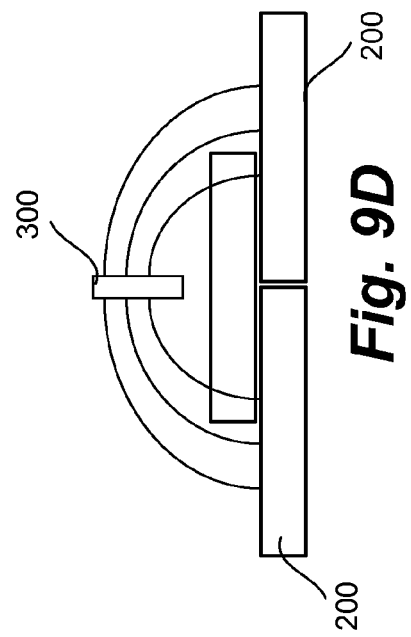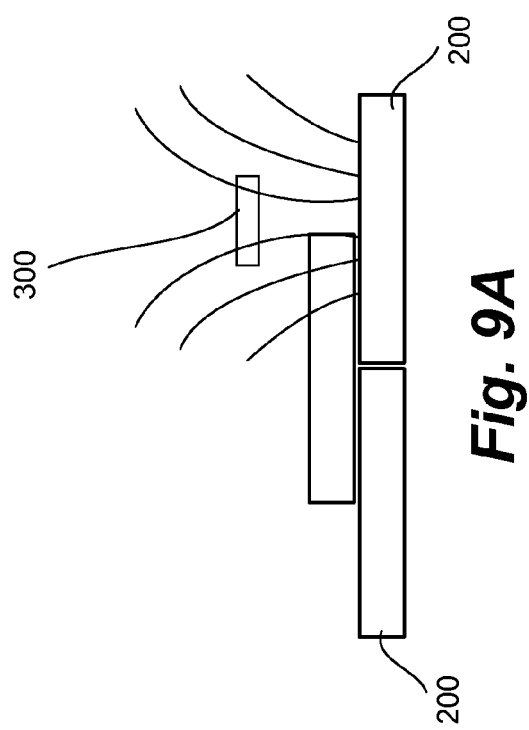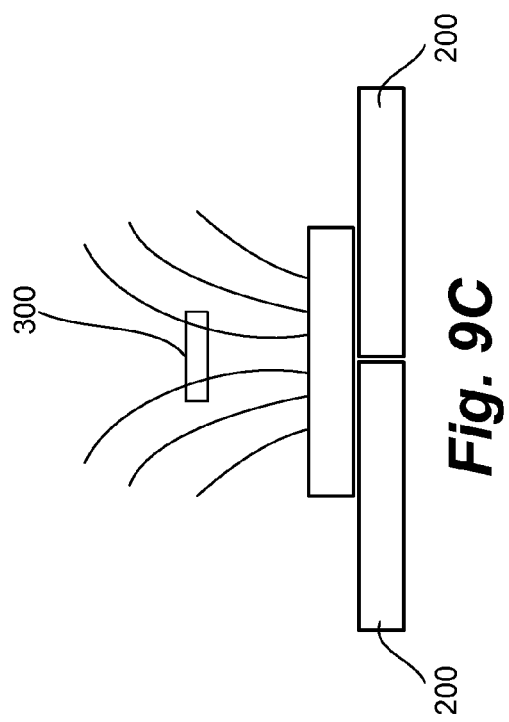

SYSTEMS AND METHODS FOR PROVIDING WIRELESS POWER TO A PORTABLE UNIT

CROSS REFERENCE TO RELATED APPLICATION

This application is a 35 U.S.C. §371 United States National Stage of International Patent Application No. PCT/US2009/045418, filed 28 May 2009, which claims priority to and the benefit of U.S. Provisional Patent Application Ser. No. 61/056,589, filed 28 May 2008, both of which are incorporated herein by reference in their entireties as if fully set forth below.

STATEMENT REGARDING FEDERALLY SPONSORED RESEARCH OR DEVELOPMENT

Not applicable.

BACKGROUND

Embodiments of the present invention relate to an inductive power providing system and, more particularly, to a power system for providing wireless power to a moving subject via inductive power means.

Generally, medical researchers are working to better understand various aspects of the human body and apply that knowledge to diagnose, prevent, and/or treat a large variety of diseases. Even though the ultimate treatment target are humans, due to complexity, cost, and even ethical reasons, medical researchers often use other subjects to conduct their research/experiments. Oftentimes, researchers use animal models for their subjects. Like humans, the use of large animals, such as primates, dogs or cats are not justified in many experiments. As a result, a large number of medical researchers are interested in conducting experiments on small animal models, such as rats, mice, guinea pigs, fish, aplysia, and the like.

Conducting research on small animals imposes certain challenges and limitations. Long-term continuous measurement of physiological parameters, such as temperature, cardiac rhythm, brain waves, neural spikes, blood pressure, body fluid chemicals, and the like, are more difficult in small animals (than large animals or humans), because they do not carry the same weight of conventional instrumentation on their bodies, particularly when compared with humans. Other than measurement, there are other types of research that require long-term electrical stimulation or injection of a drug in response to a cue or on a regular, predetermined basis, which also are limited when using a small animal as the source. When these animals are tethered or highly confined, the experiment may be biased. This is particularly the case in behavioral neuroscience research experiments, where the natural behavior of the animal in an enriched environment is significant.

In one example, neuroscientists study the functional organization of vertebrate and invertebrate nervous systems in the hope that the knowledge can aid in the prevention, diagnosis, and treatment of disease and dysfunction in the human brain. In vivo electrophysiology has been a powerful tool in pursuing that goal. It has provided data on areas ranging from the organization of primary visual cortex to neural correlation of working memory in the prefrontal cortex. Data from in vivo electrophysiology has helped in the treatment of disorders, including but not limited to schizophrenia, epilepsy, and depression. Many of these discoveries have been made in large experimental animals (e.g., non-human primates and cats) that were either anesthetized or highly restrained, and this approach continues to be productive. Many experimental questions, however, require awake and freely-moving subjects in enriched natural environments. Logistical constraints, cost, life-span, and housing often necessitate using small animals, particularly rodents. The increased importance of genetically-altered mice further highlights the utility of recording in small experimental animals, particularly without the need of removing the power source (battery) for recharging purposes.

Most conventional wireless recording systems for reading and obtaining neural signals involve powering a headstage, which may include analog/digital data conversion and wireless transceiver blocks, with batteries. Batteries add to the size and weight of the wireless system, which is carried by the animal body. For example, animals often carry the wireless system on the head to eliminate damage from chewing, which limits the size of the system leaving less room for the electronics that perform the main tasks. Users and designers of such systems always have to make a compromise between the duration of the experiment and how much payload the animal can carry on its head before it affects its normal behavior. Depending on the complexity and power consumption of the wireless system, this tradeoff limits the duration of each trial to only one or two hours on average before the battery needs to be recharged or replaced. Implantable versions, which should be a few times smaller and lighter, may not even run for an hour before requiring a recharge.

Most neuroscientists, however, particularly those who record from the central nervous system through multiple parallel channels and may have to deal with large volumes of data, forgo the freedom and benefits of wireless data acquisition and tie their animals to large electrophysiology instrumentation with cables. As a result, they face several limitations. A first exemplary limitation is the limited range over which an animal can traverse can be only as large as the cable length permits. Hence, most recording studies in freely moving animals use a relatively small area (typically less than one square meter). A second exemplary limitation is that the cables can double as antennas and pick up electromagnetic noise and interference making it necessary to shield the cage and move the instrumentation further away from the signal source (the animal), which can exacerbate the problem. A third exemplary limitation is that the cables also introduce motion artifacts, particularly when their connectors wear off over time. A fourth exemplary limitation is the need for an unobstructed clearance between the headstage and the data acquisition system prohibits studies in which the animal is allowed to enter enclosed chambers. A fifth exemplary limitation is the weight and sheer stress that the cables add, at least in part to the amount of weight that must be supported by the animal. The cables also induce psychophysical distress and may bias the animal behavior. A sixth exemplary limitation relates to studies that involve more than one animal, which are not feasible in hardwired systems due to the likelihood of cables becoming entangled. A seventh exemplary limitation is that many in vivo recording studies require a commutator to deal with the twisting forces exerted on the cable. Motorized commutators are quite expensive and are potential sources of audio and radio frequency noise. Nevertheless, they are commonly used in setups with a large number of recording and/or stimulation channels.

There have been several recent attempts to develop inductively powered recording systems for batteries in wireless systems. Each of these attempts has stumbled across technical issues that prevent them from being practically applicable, for example and not limitation, to neural recording. For example, one exemplary system proposed an array of nine coils, each 5×5 cm², at the bottom of a cage to power an implanted 6×6 mm² coil. This system faced large voltage variations (between 4 and 21 V) as the animal moved around the cage. Hence, there was a significant change in magnetic flux density at the edge of the adjacent coils. Also, the heat dissipation was excessive since all the coils were continuously on. Another exemplary system demonstrated an implantable stimulator and powered it in a chamber surrounded by three sets of coils in three dimensions. The system had an open-loop design, and the size of the chamber was limited to 17×16×16 cm³. Consequently, the animal was quite constrained in terms of the range over which it could move. Yet another exemplary system demonstrated a narrowband wireless system for measuring blood pressure with closed loop power. This system limited the animal movements to a small cage. In another exemplary system, a commercial telemetric device, called VitalView, developed by Mini Mitter Inc. (Bend, Oreg.) is limited to 56×29 cm, and its bandwidth suits low frequency biological signals such as body temperature or heart rate.

Accordingly, there is no currently available system that is suitable for, among other things, neural interfacing in small behaving animals.

SUMMARY

Briefly described, embodiments of the present invention relate to an inductively-powered system for charging or powering a device.

Exemplary embodiments of the present invention relate to a wireless charging system for charging or powering inductively. The system includes a stationary base system comprising a primary coil system emitting a magnetic field. The system also includes a portable unit carried by a moving object. The portable unit includes secondary coil that is adapted to be inductively charged and powered by the magnetic field of the primary coil system, which is part of the stationary base system.

The primary coil system includes an array of primary coils that emit the magnetic field. The portable unit can include a tracer, which can be tracked by a sensor system of the stationary base system. In an exemplary embodiment, the tracer is a magnet being tracked by one or more magnetic sensors.

In one aspect, exemplary embodiments of the present invention relate to an inductively-powered wireless electrophysiological data acquisition system that allows researchers to conduct a wide variety of experiments on freely moving laboratory animals. The system can transmit neural signals wirelessly and can receive power wirelessly. In an exemplary embodiment, the system can permit, for example, single-unit recordings for many hours or even days in completely enclosed experimental arenas.

In an exemplary embodiment, the system includes a scalable planar array of intelligent stand-alone wireless sensor modules that enable the operation of one or more miniature implantable microelectronic devices (IMD) that are implanted in a small freely moving animal subject or, alternatively, attached externally to its body, e.g., its head. The system can reduce, if not eliminate, the need for including a power source, e.g., a battery, within the IMD. As a result, the weight and size of the IMD can be significantly reduced. The system can inductively energize one or more IMDs through an array of modular overlapping planar spiral coils (PSC) evenly distributed beneath the IMD, while magnetically tracking it in real-time. Furthermore, the system can wirelessly interrogate the IMDs through a wideband bidirectional wireless link.

The system can provide many advantages compared to the conventional battery-powered wireless options or to hard-wired options. For example and not limitation, advantages include: 1) a substantial reduction in the weight and size of the portable unit that should be supported by the animal, 2) an unlimited operating time of the inductively powered transmitter, 3) an extendable area over which the animal can travel without putting constraints on the shape of the arena, and 4) additional technology to accurately monitor the position and orientation of the magnetic tracer affixed to the portable These and other objects, features, and advantages of the present system can become more apparent upon reading the following specification in conjunction with the accompanying drawing figures.

BRIEF DESCRIPTION OF THE DRAWINGS

FIGS. 9A-9D illustrate views of magnetic flux emitted by a stationary unit and through a portable unit, in accordance with exemplary embodiments of the present invention.

DETAILED DESCRIPTION

Figure 1:
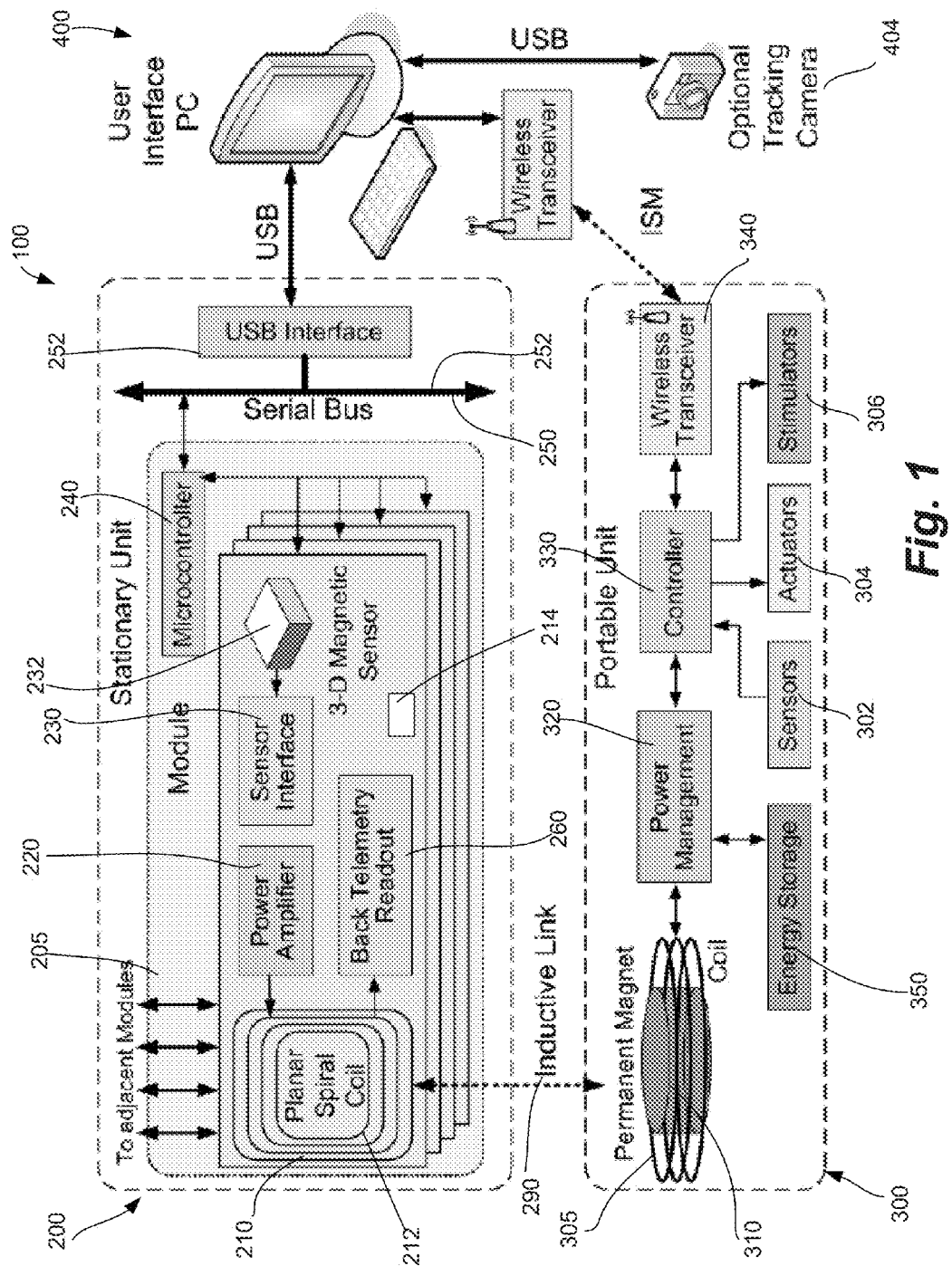
FIG. 1 illustrates a block diagram of a wireless charging system, in accordance with an exemplary embodiment of the present invention.

To facilitate an understanding of embodiments, principles, and features of the present invention, they are explained hereinafter with reference to implementation in illustrative embodiments. They are described in the context of being a system for inductively charging a device, and more particularly wherein the device that is dynamic or moveable.

Embodiments of the present invention, however, are not limited to use in the described systems. Rather, embodiments of the present invention can be used when a system for charging or powering a device as is desired or necessary. Thus, the system described hereinafter as a wireless charging system for a moving subject or a headstage can also find utility as a system for many applications beyond moving subjects/headstages, including but not limited to stationary, static, or non-moving devices.

The components and features described hereinafter as making up the various embodiments are intended to be illustrative and not restrictive. Many suitable components and/or features that would perform the same or a similar function as the materials described herein are intended to be embraced within the scope of embodiments of the present invention.

Referring now to the drawings, wherein like reference numerals represent like parts throughout the views, embodiments of the present invention can be described in detail. Embodiments of the present invention relate to a wireless charging system for wireless charging and powering a moving subject and/or a headstage.

FIG. 1 illustrates a block diagram of the wireless charging system, in accordance with an exemplary embodiment of the present invention. The wireless charging system 100, or a system for simultaneously wirelessly charging or powering a device, comprises a stationary unit 200, a portable unit 300, and processing system 400. The stationary unit 200—or a stationary base, a base unit or base system—is a system adapted to emit a magnetic field for providing power to the portable unit 300. The portable unit 300—or headstage or device adapted to be carried by a moving subject—is adapted to be powered or charged by the stationary unit 200. The elements of the stationary unit 200 emit a magnetic field to charge or power the portable unit 300. Data and information relating to both the stationary unit 200 and the portable unit 300 can be relayed to the processing system 400. For example, both the stationary unit 200 and the portable unit 300 can be in communication, either wirelessly or in a wired manner, to the processing system.

In an exemplary embodiment, the stationary unit 200 can comprise a plurality of modules 205. Each module 205 can include an array or a plurality of primary coils 210, a power amplifier 220, a sensor system 230, a communication means 250, and a telemetry readout system 260. Further, each module 205 can include a microcontroller system 240; alternatively or in combination, the array of modules can include the microcontroller system 240. In addition, the stationary unit 200 can include a means of communicating with the processing system 400, including but not limited to a wired communication interface, such as a universal serial bus (USB) interface 252, and a transmitter for wireless communication with the processing system 400.

In an exemplary embodiment, the portable unit 300 can comprise one or more secondary coils 305, a tracer 310, a power management system 320, a control system 330, a wireless transceiver 340, an energy storage system 350, and a means of interacting with the moving subject, for example and not limitation a living being, including but not limited to a rat, mouse, guinea pig, cat, dog, fish, aplysia, human and the like (often referred to herein as the "animal", though other subjects can be used including primates, nonhuman primates, and/or humans). The portable unit 300 can be mounted onto the moving subject. Alternatively, the portable unit 300 can be implanted in the moving subject. In one exemplary embodiment, the portable unit 300 can be implanted in the cranial cavity of the moving subject. In another exemplary embodiment, the portable unit 300 can be coupled to the head of the moving subject and in communication with a portion of the brain of the moving subject, for example in communication with the brain's neural circuitry commonly known as cortex. The portable unit 300, however, can be positioned in or on other locations of the subject body to be carried by the moving subject, and may depend on the measurements or stimulus desired to receive or apply, respectively, to the moving subject.

The stationary unit 200 comprises the array or a plurality of primary coils 210 or modules. The array of primary coils 210 are arranged in a manner that they furnish a predetermined area with a predetermined magnetic field with a predetermined intensity. In an exemplary embodiment, the stationary unit 200 can be positionable beneath the moving subject carrying the portable unit. In another embodiment or in combination, the stationary unit 200 can be positioned above and/or beside the moving subject. In a more specific exemplary embodiment, a caged area in which the movable subject is enclosed is floored in its entirety with the array of primary coils 210.

Each primary coil 210 can be a printed spiral coil (PSC). Many shaped coils can be implemented as the primary coils 200, for example and not limitation square, rectangular, circular, elliptical, helical, hexagonal, octagonal, oval, pentagonal, rhombohedra, trapezoidal, triangular, and the like.

In an exemplary embodiment, PSCs can be square-shaped and can be arranged in a way that they furnish the entire area under an animal cage or maze tracks (e.g., for behavioral experiments). To minimize the effects of magnetic field variations at the boundaries of each of the PSCs, each PSC can overlap at least one other PSC.

Figure 2:
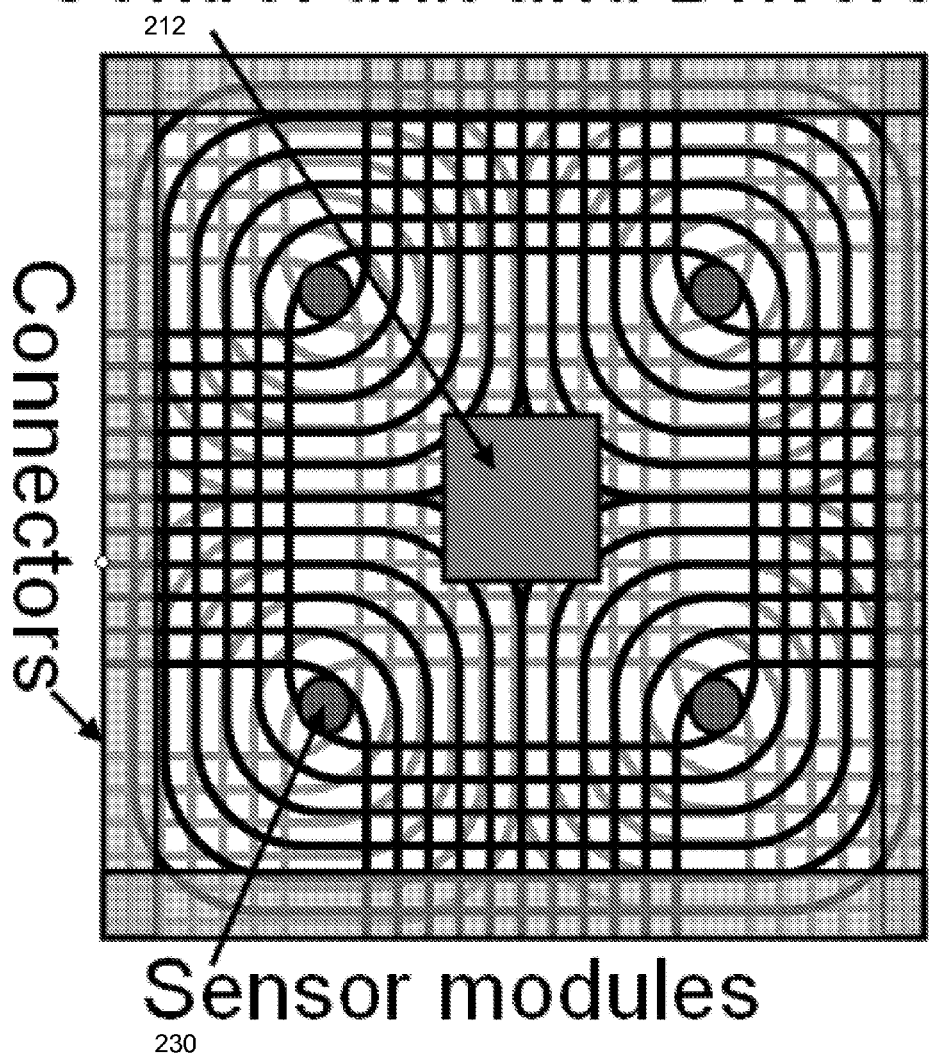
FIG. 2 illustrates a schematic of a single building block module of a stationary unit of the wireless charging system, in accordance with an exemplary embodiment of the present invention.
Figure 3:
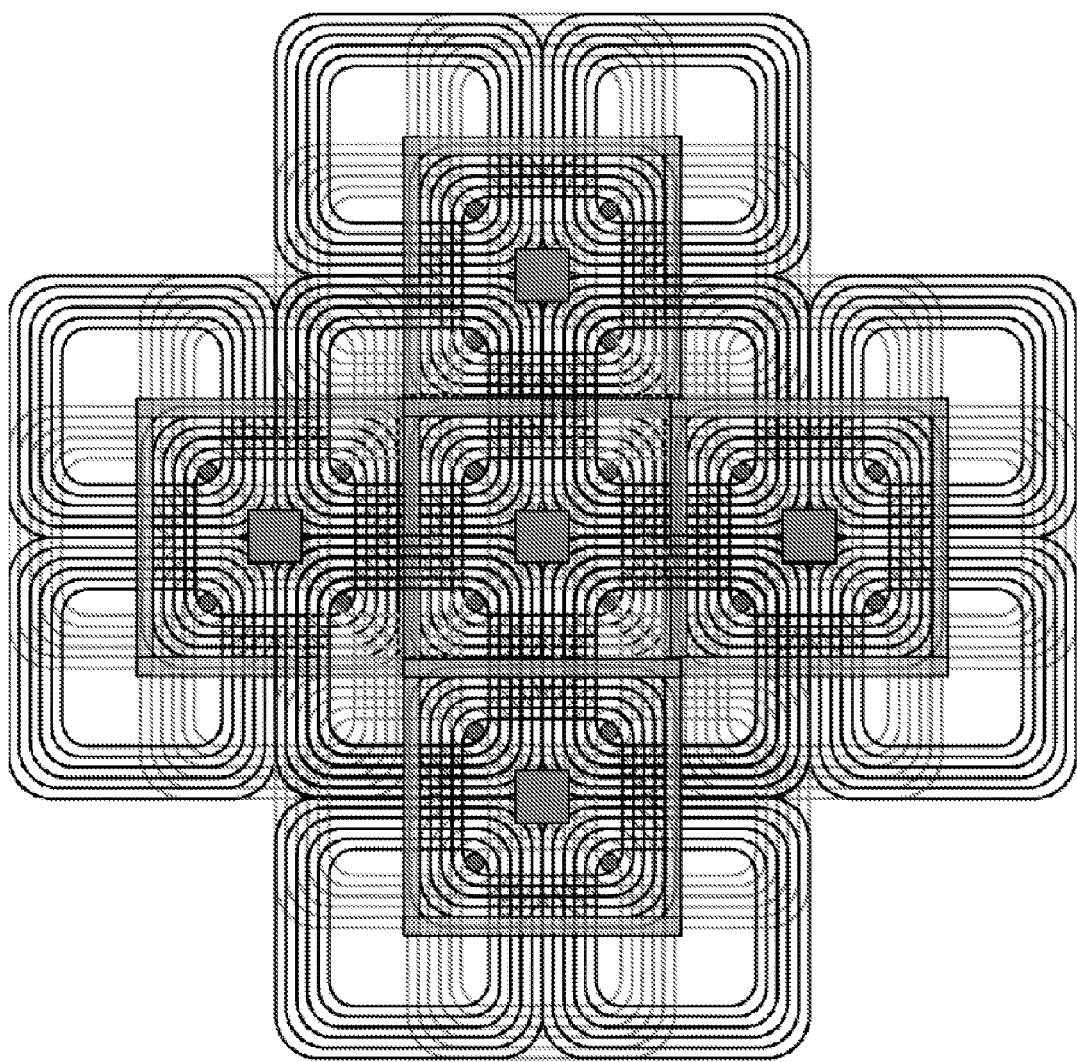
FIG. 3 illustrates a schematic of the scalable array of interconnected modules of the stationary unit of the wireless charging system, in accordance with an exemplary embodiment of the present invention.

For instance, in an exemplary embodiment, each PSC overlaps eight other PSCs, which is exemplarily illustrated in FIG. 2. The original PSC is the center is intact, four PSCs on the four corners of the module overlap the original PSC on four sides (each by a quarter) and four other PSCs overlap the original, centered PSC on four sides by a half. Consequently, each module that is repeated in the X-Y plane includes a total of four PSCs, one of which is complete, two of which are divided in half, and one of which is divided into four quadrants. Exemplarily, there can be four connectors on the sides of each module that can provide interconnections between adjacent modules. Incomplete PSCs form complete PSCs once several modules are interconnected, as illustrated in FIG. 3.

In an exemplary embodiment, the modules 205 are a scalable planar array of stand-alone wireless sensor modules that can enable operation of one or more portable units 300 carried by a living being (i.e., a moving subject). One purpose of the array of primary coils 210 of the module 205 is to reduce, if not eliminate, the need of a battery within the portable unit 300. By reducing or further eliminating the need of a battery, the weight and size (e.g., volume) of the portable unit 300 can be reduced. The system 100 permits the portable unit 300 to be inductively energized through the array of modular overlapping PSCs that can be evenly distributed near (e.g., above, beneath, or beside) the living being carrying the portable unit 300.

Figure 4:
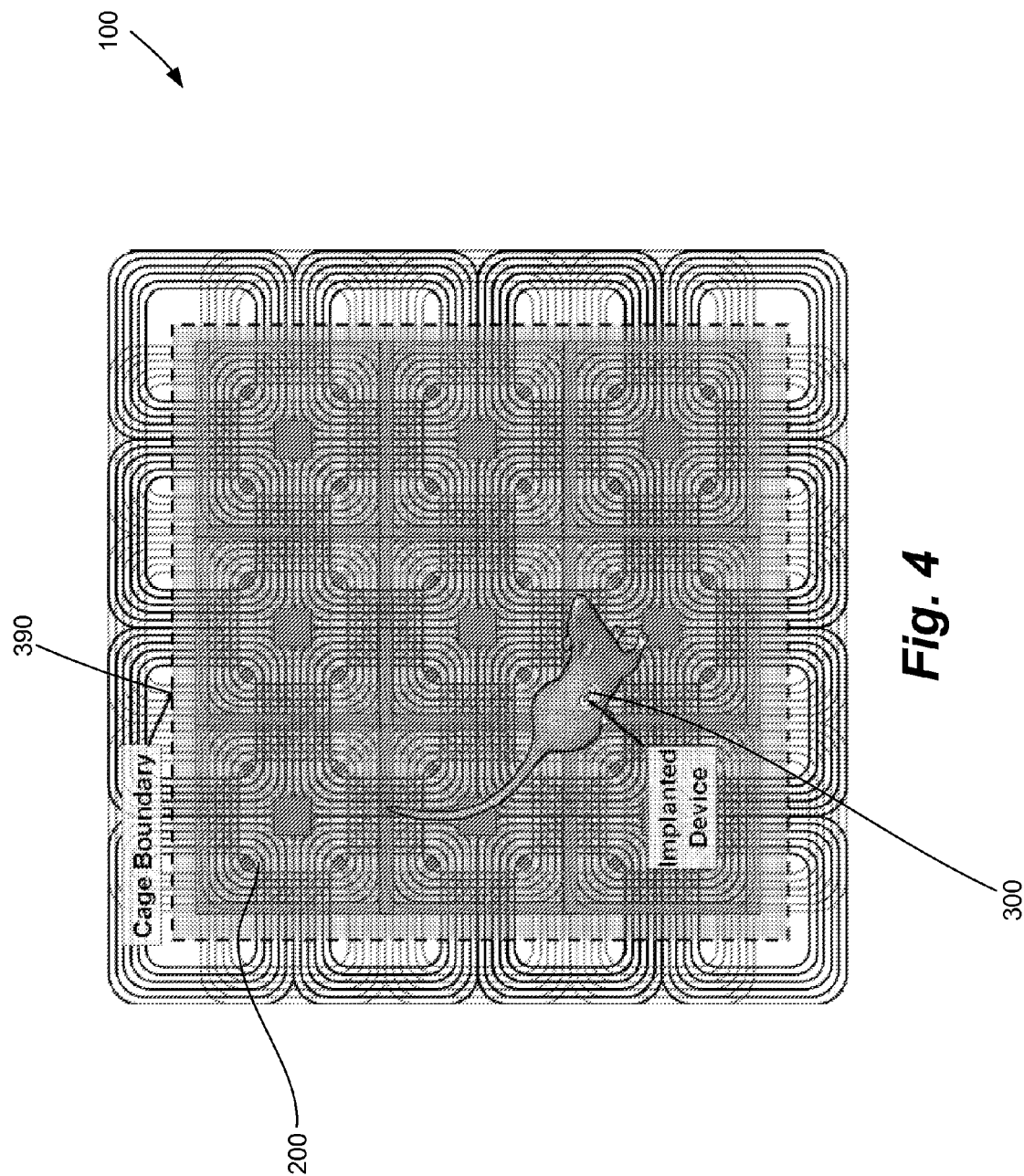
FIG. 4 illustrates a top view of the array of modules of the stationary unit and a portable unit carried by a living being, in accordance with an exemplary embodiment of the present invention.

Each module 205 includes a control system 214 for controlling the PSCs of each module. These control systems 214 are in communication with the microcontroller system 240. With several modules 205 being interconnected, the control systems 214 collectively can form a synchronous network, and thus communicate through a communication means 250. For example, the communication means 250 can includes a common serial bus 252. Further, the serial bus 252 can be a serial peripheral interface (SPI), or an inter-integrated circuit ($I^2C$) bus, which can be in communication or have a processing system that controls the system. Each control system 214 can include control, drive, and readout circuitry for four individual PSCs, as illustrated in FIG. 4. Because a user may desire to monitor the operation and control of the system 100, a graphical user interface can illustrate its power level through an interface of the processing system 400, for example, a monitor and a personal computer.

Each module 205 further can include a sensor system 230 for sensing characteristics of the portable unit 300. In some embodiments, the sensor system 230 can include at least one three-dimensional magnetic field sensor 232. The magnetic field sensors 232 can be positioned half-way between each corner and the center of the module 205, e.g., in the center of each quadrant of the module 205. Collectively, in an exemplary embodiment, these magnetic sensors 232 can form a uniform two-dimensional array beneath the living being carrying the portable unit 300.

The magnetic sensors 232 can be adapted to track a permanent magnetic tracer 305 incorporated in the portable unit 300. The interfacing and readout circuitry for these magnetic sensors 232 can be part of the control system 214, and can transmit digitized packets of magnetic field measurements to the processing system 400 via the communication means 250, e.g., the serial bus 252.

The portable unit 300 can be carried by a mobile or moving subject. In an exemplary embodiment, the portable unit 300 can be implanted into a living being, for example and not limitation a small animal, a large animal, and/or a human. In another exemplary embodiment, the portable unit 300 can be carried by the living being, including, for example, being carried by the head of the living being in the form of a headstage. The portable unit 300 can provide a sensor assembly 302, stimulation assemblies 304, and actuation means 306 of interest with a stable supple of harvested inductive power, as well as wireless bidirectional communication with the processing system 400. In an exemplary embodiment, the portable unit 300 can include a wireless implantable neural recording system, as is described in U.S. Ser. No. 12/468,015, filed 18 May 2009, which is incorporated by reference herein as if fully set forth below.

FIG. 1 illustrates a block diagram of the system 100. As illustrated, the stationary unit 200 and the portable unit 300 can interact with one another via an inductive link 290 between the active PSCs on the stationary unit 200 acting as a transmitter and a the second coil 305 of the portable unit acting as a receiver wound around the permanent magnetic tracer 310 as its core. Each PSC on the module 205 can be driven by an individual high-efficiency power amplifier 220, such as a class-E circuit, which can be controlled by the microcontroller system 240. As further illustrated in FIG. 1, each module 205 of the stationary unit 200 can include the telemetry readout system 260 (also commonly known as a back telemetry readout system, passive back telemetry, impedance modulation, load shift keying (LSK), and radio frequency identification (RFID)).

On the portable unit 300, the receiver coil (i.e., secondary coil) 305 is followed by a power management system 320 that can include a full-wave rectifier or full-wave back telemetry rectifier. The back telemetry rectifier 260 can have high alternating current (AC) to direct current (DC) power conversion efficiency. The full-wave rectifier can be followed by a low dropout regulator. In addition to the on-ship local regulator, harvested power on the portable unit 300 can be regulated through a closed-loop back telemetry feedback, which can continuously adjust the received power at a user-defined level.

The closed-loop system can be adapted to ensure the right amount of power (or the right magnetic field) is emitted from the stationary unit 200 to the portable unit 300.

The portable unit 300 can further include a wireless transceiver 340 for controlling electronics to stabilize the direct current supply voltage of the portable unit 300 by adjusting the PSC driver output power, for example, in response to changes in the position and orientation of the portable unit 300. Both the stationary unit 200 and portable unit 300 ultimately communicate with the processing system 400 through either a hardwired or wireless interface. For example, in an exemplary embodiment, the stationary unit 200 can be in communication with the processing system 400 via a wired interface, such as a USB interface, while the portable unit 300 can be in communication with the processing system 400 via a wireless interface, for example a bidirectional, wireless ISM-bank link such as Bluetooth, ZigBee, and the like.

The arrangement of the overlapping modules 205, including the overlapping PSCs, assist with ensuring that the distance between the portable unit 300 and the center of the closest PSC is approximately less than a quarter of the size of the PSC diameter, regardless of the position of the portable unit 300 relative to the stationary unit 200. In an exemplary embodiment, the stationary unit 200 includes a border 390 that permits the portable unit 300 to remain within certain boundaries to further ensure that this distance between the center of the module 205 and the portable unit 300 is maintained. In an exemplary embodiment, this distance is preferred because the amount of power that the secondary coil 310 of the portable unit 300 receives has a strong relationship with its distance from the center of the active transmitting module 205, or more specifically the active PSC.

The size, number of turns, and geometry of the PSCs can be optimized based on the size of a moving subject carrying the portable unit 300, the diameter of the implanted or head-mounted neural interfacing device, the inductive link operating frequency, and other available factors. Once the optimal size of the PSC is indicated, the specific dimensions and geometry of the boundaries do not affect the performance of the system 100, because of its scalability and modular architecture. In an exemplary embodiment, a bottom of a cage atop the stationary unit 200 can have boundaries, for example, on at least one side to communicate with adjacent tiles/modules. The boundary can have different shapes, including circular, triangular, square, and the like. This provides a simple and modular design that enables the boundaries of the portable unit 300 to be increased and/or decreased as desired.

In an exemplary embodiment, a majority of the modules 205 of the stationary unit 300 of the system 100 can be maintained in a standby mode consuming a negligible amount of power, except for those modules 205 that are closest to the portable unit 300, and thus positioned best to energize the portable unit 300 (e.g., between one and three modules). This feature can minimize the overall power consumption of the system 100, and specifically the stationary unit 200, and further minimize the heat dissipated that can affect the temperature of the stationary unit 200 and/or the portable unit 300.

In addition, the portable unit 300 can include a system to provide a real-time positioning. For example, in an exemplary embodiment, a video camera and image processing system 404 can be used to monitor movement of the portable unit 300 within a known boundary. Depending on the setup, the portable unit 300 or the subject carrying the portable unit 300 can further include a small light emitting diode (LED) that can also be powered by the stationary unit 200. The LED can provide the indicator of the position of the portable unit 300, and thus the camera 404 can track movement of the portable unit 300, in some embodiments with the help of image processing software. In another exemplary embodiment, which can be implemented with or separate from the camera system 404 an array of the three-dimensional magnetic field sensors 232 can be included in each module 205 to form a network of intelligent sensors. In such a system, the portable unit 300 can include the permanent magnet 310, for example and not limitation the size of a lentil, that operates as a magnetic core to enhance the receiver coil (secondary coil) of the portable unit 300 with inductive coupling of the PSC, and thus a magnetic tracer 310 to track such movement.

The magnetic tracking technique can indicate the position (in the X, Y and Z coordinates) of the portable unit 300 within known boundaries of the stationary unit 200 with high accuracy and can also indicate the relative orientation (A, (p) of the portable unit 300. Because it is preferred that the coil 305 of the portable unit 300 remain substantially perpendicular relative to the primary coils 210 of the stationary unit 200 for maximum magnetic field transfer, it is useful to know the orientation of the portable unit 300, and specifically its coil 305. Having this information is helpful because the coupling between the PSCs and the coil 305 of the portable unit 300 is not only a function of their relative distance, but also their relative orientation.

Figure 5:
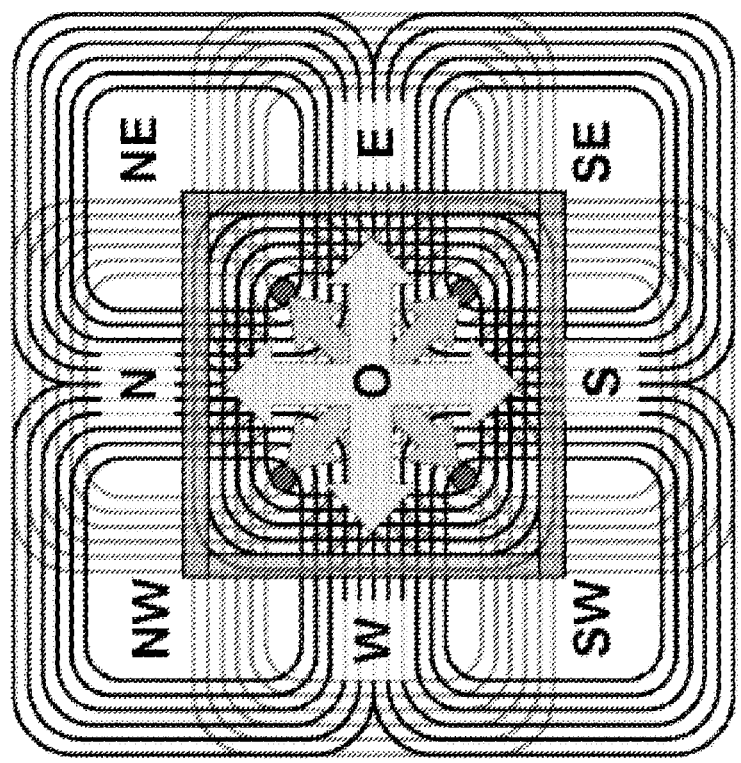
FIG. 5 illustrates a schematic showing the steering of an alternating current magnetic flux by controlling an amplitude and phase difference between overlapping coils of a stationary module, in accordance with an exemplary embodiment of the present invention.

Consider an example where a four-legged animal, such as a rat, carries the portable unit 300 on/in its head. When installed, the portable unit 300 is positioned for the majority of the time, where the rat walks on all fours and the coil 305 of the portable unit 300 is positioned parallel relative the coils 210 of the stationary unit 200. When the rat stands on its feet or rolls, the receiver coil 305 of the portable unit 300 may no longer be in parallel with the horizontal PSC plane. In an exemplary embodiment, in order to retain a good coupling without tilting the PSC array is to steer the AC magnetic field flux lines towards the tilted coil, such that they pass through the receiver coil 305 plane at correct angle. This is feasible in present system by controlling the amplitude and phase difference between overlapping and nearby PSCs, which can form several figure-8 coils in different directions, as shown in FIG. 5. For example, activating the center PSC-O out of phase with PSC-N steers the AC magnetic flux towards north. To conduct this steering, the position, tilting, and orientation of the receiver coil relative the stationary unit may be needed.

The processing system 400 can gather the direct (e.g., non-alternating) magnetic field measurement data from the array of three-dimensional sensors 232 of the stationary unit 200, which may already be digitized in the sensor interfacing circuitry. Signal processing software running on the processing system 400 can process that information in real-time, for example, by using inverse magnetic field localization algorithms in order to indicate the location and orientation of the permanent magnetic tracer of the portable unit. In an exemplary embodiment, using magnetic dipole equations along with particle swarm optimization (PSO) and neural network algorithms can show that it is possible to achieve spatial (X, Y, Z) and orientation ($\theta$, $\phi$) accuracies in the orders of approximately ten millimeters or less (e.g., 1 mm) and approximately ten angle degrees or less (e.g., 5°), respectively. Considering the animal size and the PSC dimensions, this level of accuracy is sufficient for the purpose of magnetic flux steering. A higher accuracy level in tracking the animal compared to the conventional imaging technique can also be beneficial to the researchers, for example, in behavioral experiments.

The system 100 can have a predetermined inductive link operating frequency, for example and not limitation, less than 30 MHz (e.g., 20 MHz). By selecting a low frequency, it can penetrate water and energize portable devices on/in the living beings that may reside in water, such as fish, aplysia and other small animal models that can be kept in aquariums. In this case, the subject is adapted to move freely in all directions, i.e., X, Y, and Z directions. The energized height of the aquarium holding the subjects can be doubled by adding additional arrays of modules on the top of the aquarium (rather than simply beneath it). In other words, in an exemplary embodiment the portable unit can be sandwiched between two planar arrays of modules 205 that are both connected to the processing system 400 and can operate synchronously.

In an exemplary embodiment, the system 100 can be used to develop and test an electrophysiology data acquisition system that can transmit recorded neural signals wirelessly and also can receive its power wirelessly. The portable unit 300 can be implanted into the head of a moving subject or, alternatively, carried by the head of the moving subject (e.g., attached externally thereto). By implementing the system 100 in this manner, the need for any hanging wires or carried batteries can be reduced or, better yet, eliminated. The system 100 includes inductively powering through a scalable array of modular printed spiral coils that can conform to an arbitrary shaped recording arena of a known shape with, in essence, no size constraints. Furthermore, the system 100 can accurately track the position and orientation of the portable unit 300, which exemplarily is implanted or carried externally to a living being's in three-dimensions using an array of magnetic sensors. In addition, the system 100 can provide unlimited continuous recording of, for example, neural signals, without interruption.

The system 100 overcomes some of the major limitations of the existing setups that use cables to connect the subject to the recording instrumentation, yet can not suffer from weight and short recording-time problems that are associated with battery-powered wireless solutions. Such advancements in bioelectrical interfacing technology can permit, among others, neuroscientists and electrophysiologists to conduct a wide variety of experiments on freely behaving laboratory living beings, including animals, which would not otherwise be feasible.

In an exemplary embodiment, the system 100 can be implemented with a scalable array of overlapping PSCs that tile a prescribed area, as may be referred to as the boundary or the recording arena, to induce power wirelessly. The modular array of overlapping PSCs can be driven in a closed-loop fashion by a network of processing system controlled power amplifiers. The PSCs can induce current in a small receiver coil (e.g., approximately Φ20 mm) on the portable unit (e.g., the headstage), followed by a fully integrated high efficiency power supply. In an exemplary embodiment, the portable unit 300 can receive a minimum approximately 20 mW of regulated power regardless of its position, orientation, or distance with respect to the PSC array that tiles a surface, e.g., the bottom of the recording arena.

In an exemplary embodiment, the system 100 can further provide an array of magnetic sensors 232 to track a magnetic tracer 310 on the portable unit 300 in three dimensions. For example, an array of smart three-axial magnetic sensor modules may pinpoint the three-dimensional location and orientation of a small permanent magnet, e.g., approximately Φ5 mm, of the portable unit 300. The permanent magnet 310 can serve as the magnetic core for the receiver coil 305 of the portable unit 300. In an exemplary embodiment, the magnetic tracer 310 can be identified within an accuracy of approximately a few millimeters (e.g., 5 mm or less) in (X, Y, Z)

location and approximately a few degrees (5° or less) accuracy in its zenith and azimuth ($\theta$, $\phi$).

In an exemplary embodiment, the system 100 can combine the PSC array, inductive power supply (IPS), and the magnetic sensor array to operate an existing multi-channel wireless integrated neural recording system (WINeR), as described in my patent application having U.S. Ser. No. 12/468,015, filed 18 May 2009, and incorporated by reference. The present system can use its inductive powering technology to remove the need of batteries of the WINeR system and its magnetic tracking technology to wirelessly operate the WINeR system in vivo. Alternatively, a commercially available wireless neural recording device can have its batteries substituted with this system's IPS module, while also incorporating the magnetic tracking technology. In an exemplary embodiment, localizing a freely behaving living being (e.g., a rat) in a large (e.g., 3 m×2 m) recording arena, tiled with the PSCs, while wirelessly recording neural signals for at least 24 hours through at least eight simultaneous channels with a minimum signal-to-noise ratio (SNR) of approximately three can now be achieved.

FIG. 4 shows a top view of the system 100. The portable unit 300, including for example and not limitation a wireless neural recording headstage, can be inductively powered by an array of modular overlapping PSCs that tile the portion, e.g., the bottom, of the recording arena. The system 100 can be equipped with an array of sensitive three-axial magnetic sensor modules that can pinpoint in three-dimensions both the location and the orientation of a small receiver coil 305 that is wound around a permanent magnetic tracer 310 of the portable unit 300. The small receiver coil 305, in an exemplary embodiment, can be placed in the approximate center of the portable unit 300.

Figure 6:
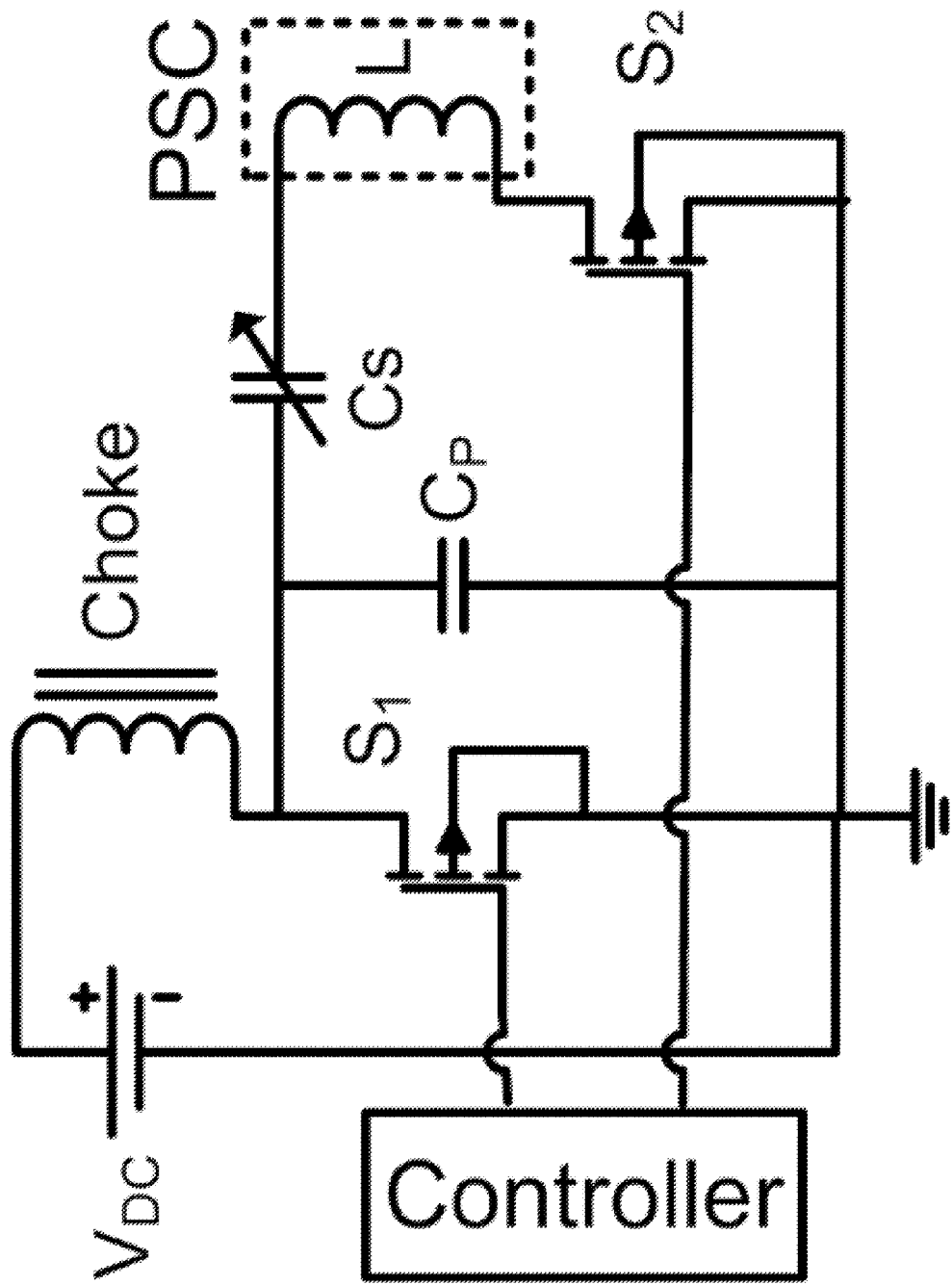
FIG. 6 illustrates a schematic of a modified class-E amplifier, in accordance with an exemplary embodiment of the present invention.

The location and orientation of the portable unit 300 can be determined by real-time processing of signals from the magnetic sensor array. In an exemplary embodiment, one or two PSCs are the closest to the location of the portable unit and thus are in the best positions to energize the headstage. These PSCs can be activated by their associated class-E power amplifiers (see, e.g., FIG. 6). Transmitted power by the class-E amplifiers can be continuously regulated in a closed-loop by a processing system 400, based on the amount of power that is delivered to the potable unit 300. This can ensure that a constant amount of power is delivered to the electronics of the portable unit 300 at the IPS output, regardless of the relative position and orientation of the portable unit 300 and its coils 305.

Among other things, the system 100 enjoys the following key advantages compared to the existing battery-powered wireless or hardwired alternatives. One, because the receiver coil and IPS chip weigh only a fraction of the batteries with comparable capacity, the weight and size of the portable unit payload is reduced, leaving more room for other systems, including sensors, data acquisition, signal conditioning, and wireless transceiver blocks. Two, even though the weight of the cables is mainly supported by the commutator, the living being can still pull them as it moves around the cage. The system can relieve the living being from being tethered with wires to a fixed location. Three, inductively powered electronics on the portable unit can operate for an unlimited period of time, which can improve a variety of functions, such as neural recording, stimulation, or other biosignal or bioelectrical measurements. Four, the scalable modular architecture allows the system to cover experimental arenas much larger than what is currently possible with hardwired systems. Moreover, the modules can cover arbitrary geometries, such as a maze with various chambers and compartments. Five, the system can monitor the position and orientation of the magnetic tracer, affixed to the portable unit, in three-dimensions without the need to maintain the living being in the line of sight. This allows precise monitoring of the activities of the living being. Six, the power carrier has been approved by the Federal Communications Commission (FCC) for Industrial, Scientific, and Medical (ISM-band) applications (e.g., at approximately 13.56 MHz). An exemplary carrier frequency is three orders of magnitude higher than the neural signal band (0.1 Hz-10 kHz), resulting in effective cancellation of the power carrier interference by the recording system low-pass filters. Similarly, the power carrier does not affect the magnetic sensors, which can have an approximate −3 dB cutoff frequency of approximately 35 Hz.

Each PSC of the stationary unit can be driven by an individual class-E power amplifier, and controlled through a closed-loop feedback from the headstage back telemetry link. The wireless feedback helps the processing system stabilize the IPS voltage by adjusting the class-E output power in response to the coupling variations of the coils, resulted from the movements of the living being. Whenever a change in the orientation of the receiver coil is detected, the amplitude and phase difference between the adjacent active PSCs can be modified in a way that the AC magnetic flux is steered in that direction. This enables the system to maintain sufficient coupling between the active PSCs and the tilted or misaligned headstage receiver coil at all time.

Unlike previous inductively powered systems, in which all the coils were continuously active, most of the PSC modules are normally off, consuming little to no power, except for those modules that are closest to the position of the portable unit, and therefore, poised best to couple to the receiver coil of the portable unit. This can minimize the overall power consumption of the system and the amount of dissipated heat that could otherwise affect the temperature inside the enclosure. This can also reduce the operating voltage of the class-E power amplifiers, reducing the risk of electromagnetic interference.

In a multilayer PCB, overlapping PSCs show both inductive and capacitive couplings. A concern may be the effect of these couplings on the power efficiency and operation of the active PSCs and their class-E drivers. In order to address this problem, a modified class-E topology, illustrated in FIG. 6, includes an additional power switch ($S_2$) in series with the PSC. The switch $S_2$ is normally open and only closes when the PSC is intended to be active, i.e., all PSCs are open-circuit at all times except for the ones that are active. The result is that no current can be induced in the adjacent PSCs despite their overlapping, and they do not affect the mutual coupling between the active PSC and the headstage receiver coil. To resolve the capacitive coupling issue, at least two solutions can exemplarily be employed. First, resonate out the capacitive coupling at the power carrier frequency, for example and not limitation, approximately 13.56 MHz by adding small surface mount (SMD) inductors between overlapping PSCs (to create infinite impedance). Second, adjust the series capacitor ($C_S$) in the class-E circuit to account for the overlapping PSCs' parasitic capacitance.

The system can provide sensor signal processing (SSP) algorithms that collect DC magnetic field measurements from the three-axial sensor array and process them in real-time to indicate the location and orientation of the permanent magnetic tracer of the portable unit. An advantage of the magnetic tracking over the conventional video-based method is that it can not only indicate the position of the portable unit with high accuracy, but also its orientation in three-dimensions. This accuracy is helpful, because the coupling between the active PSCs and the receiver coil can be a function of their relative spatial and angular misalignments in three-dimensions, particularly when the living being changes its position, e.g., goes from all four legs down to standing on its hindlimbs. In addition, many behavioral experiments researchers are interested in the orientation of the head of an animal subject, because it may indicate what the animal is doing. Unlike the optical methods, which require the animal to be in the line of sight, and their resolution degrades with the extension of the field of view, the modular magnetic tracking method of the present system can operate in both open and covered spaces with the same resolution independent of the size of the arena.

Embodiments of the system can have broad applicability for basic and translational neuroscience research. Listed below are several important avenues of research enabled by the system's combination of wireless power induction, wireless data recording, wireless command transmission, and precise position/orientation tracking. The following non-limiting examples can illustrate that, although many of the parameters are optimized for a recording study of memory in the hippocampus of a living being, the potential impact of the proposed technology goes far beyond basic memory research.

First, the system can be used to study epilepsy. Unlike other battery-powered wireless systems that require frequent recharging or cabled systems that require constant monitoring of cable tangling, the system can be used for very long uninterrupted recording sessions. This feature can prove helpful in epilepsy research, because epileptic seizures are rare and unpredictable. Sometimes the living being need to be monitored for several days, weeks, or even months before enough data can be collected. Intervention during this period can potentially alter the onset of seizures and affect the overall results. Conventionally, it is difficult to differentiate between the effects of intended and unintended interventions when monitoring sessions are being frequently interrupted with cable or battery attachment/detachments.

Second, the system can be used for translational research on Parkinson's disease. Deep brain stimulation (DBS) is a promising treatment for Parkinson's disease. Conventional experiments on living beings, such as rats and mice, include only a few hours of DBS per day and may not even continue on a daily basis. Unfortunately, the conventional battery powered wireless devices are not useful, because DBS often has high power demands. In humans, on the other hand, the stimulator is constantly on and the neurons are continuously exposed to stimulation. Conventional technology cannot replicate the same effects of long term stimulation and adaptation in small animal models, and the only alternative is using costly primates. The present system can keep the stimulator up and running continuously, e.g., 24/7/365, if needed, extending and facilitating translational research in this area.

Third, the system can be used for adding enclosed chambers in enriched in vivo experimental environments for behavioral research. The inclusion of three-dimensional position, direction, and orientation monitoring, for example of a head, along with the wireless recording and energizing technologies can allow a range of experiments in which a living subject is allowed to enter completely enclosed chambers or to pass through enclosed openings. For example, small experimental animals may be burrowing animals for which "underground" tunnels would provide a more ecologically valid framework for experimentation. In addition, the possibility of testing in enclosed chambers makes more practical conducting recording experiments in automated testing chambers. Research enabled by the present system can be long-term recording experiments investigating the beneficial effects of environmental enrichment, which are thought to be important for aging, Alzheimer's disease, Huntington's disease, neurogenesis, and recovery from brain injury.

Fourth, the system can be used for inclusion of small animal subjects, such as mice and even insects. The reduction in weight and size of the portable unit, e.g., the headstage, by eliminating the cable and batteries can allow advances in recordings from very small experimental animals. In smaller animals the coil of the portable unit can be closer to the PSC array on the bottom of the arena. Therefore, a smaller headstage coil can provide the same amount of coupling. In fact, the system can be scaled down to levels that would be suitable for experiments on non-flying insects. Furthermore, the increased importance of genetically-altered mice for all areas of neuroscience and cancer research makes the significance of weight reduction high.

Fifth, the system can be used for researching and recording multiple interacting subjects. The wireless links in recording or stimulating devices can be tuned to different frequency bands, thereby permitting experiments in which "multiple", freely interacting animal subjects are recorded or stimulated "simultaneously". This would be difficult, if not impossible, in hardwired setups. The emerging field of social neuroscience can benefit from a future experiment in which simultaneous, long-term recordings were made from multiple animals in an enclosed environment. An example is long-term comparative recordings in the ventral pallidum of monogamous and polygamous voles in pair-bonding studies.

Sixth, the system can be used for increasing the number of recording or stimulating channels. A limiting factor for the expansion of recording technology into higher channel numbers (and thus more recorded cells) is the encumbrance of a thick and heavy cable, and the developmental bottleneck of an expensive, mechanical commutator. Similarly, in wireless recording systems, the increase in power consumption of such systems would require larger and heavier batteries. The system can provide more power by slightly increasing the receiver coil diameter. Enabling much higher channel counts in in vivo electrophysiology can be important for many areas of research, particularly in the development of neural prosthetics.

Seventh, the system can be used for neuroscience experiments on marine subjects. Considering the fact that water is transparent to low frequency magnetic fields (e.g., below approximately 20 MHz), the system can power hermetically sealed wireless recording or stimulating devices attached to small marine subjects, for example and not limitation aplysia or fish, as long as they are kept in shallow aquariums. Shallow aquariums can be up to approximately 10 cm deep, assuming the PSC array is placed at the bottom. Alternatively, shallow aquariums can be approximately 20 cm deep if a pair of PSC arrays is placed both on the top and bottom of the aquarium. Larger and deeper aquariums can also be supported by increasing the diameter of the overlapping PSCs in the stationary unit array. Among others, one experiment enabled by the system can be long-term recording experiments of consolidation and reconsolidation of previously acquired fear in medaka fish.

Eighth, the system can be used to provide unconstrained navigation in large arenas. For a variety of logistical issues (weight, cost, noise issues, tangling due to overabundance of slack) recording cables are often limited to lengths of less than a couple of meters, thus typically limiting the foraging range of the portable unit to less than one square meter. The wireless technology can permit experiments in which a living being that is monitored with the portable unit is allowed to freely navigate over an area much larger than what is possible with a cabled system.

As mentioned above, the stationary coils include an array of coils, which may be an array of PSCs, or other types of coils. PSCs are popular in powering implantable devices because they can conform to the surface of the body. PSCs may be used over wire-wound coils in the present system because, one, they can be easily batch-fabricated at low cost on multilayer PCB, two, their geometries can be lithographically defined and can be optimized to maximize their coupling, and, three, they can be overlapped to provide homogeneous magnetic field, resulting in less coupling variations due to animal movements.

Figure 7:
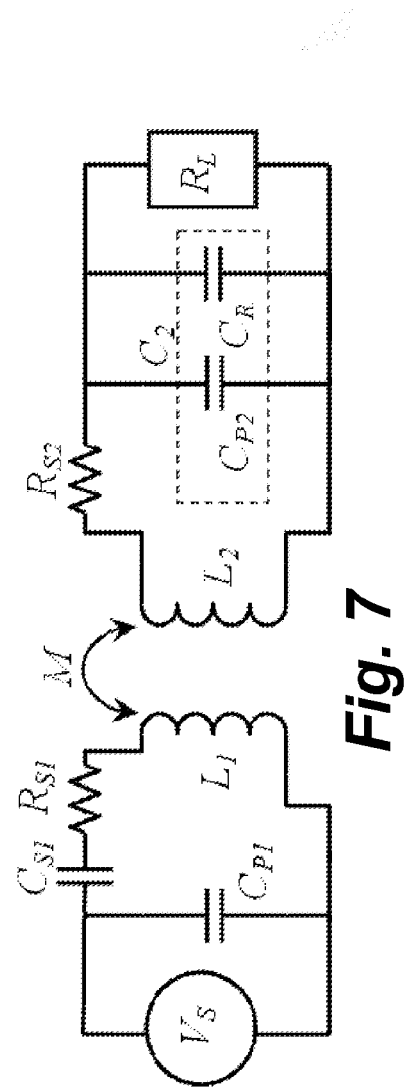
FIG. 7 illustrates a schematic of an inductive link model, in accordance with an exemplary embodiment of the present invention.

FIG. 7 illustrates a simplified model of an inductive link between a pair of coupled coils ($L_1$ and $L_2$), which constitute a transformer. In this case, $L_1$ can be part of a class-E power amplifier, shown in FIG. 6, which forms a resonance circuit along with $C_{P1}$, $C_{S1}$, and $V_S$. A goal is to maximize 11, which is the ratio between the power delivered to $R_L$ (representing the headstage electronics or other kinds of loads that can be supplied by the IPS) and the power drained from $V_S$, which relates to the stationary unit power supply. η is proportional to $k^2 Q_1 Q_2$, where $k=M/(L_1 L_2)^{0.5}$ is the coupling coefficient between the two coils, and $Q_1$ and $Q_2$ are their quality factors.

Previous design methodologies for coils made of one-dimensional filaments are not accurate enough to consider all geometrical aspects of the PSCs with planar three-dimensional conductors. The theory of optimal power transmission in inductive links is combined with semi-empirical PSC models that predict parasitic components to devise an iterative PSC design methodology, which starts with a set of realistic design constraints and ends with the optimal PSC geometries. Simulations have verified this result using a commercial field solver, e.g., HFSS (Ansoft, Pittsburgh, Pa.), as well as measurements using PSCs fabricated on PCB.

Figure 8A:
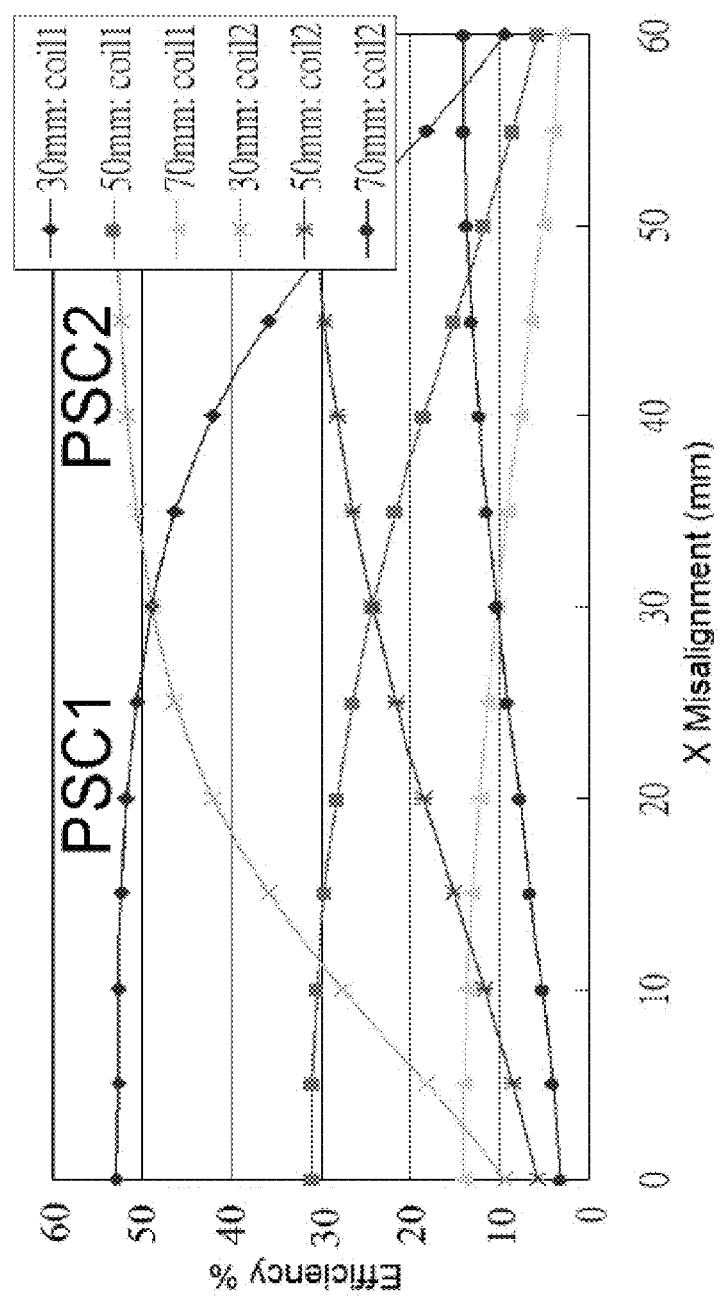
FIG. 8A illustrates a graphical representation of efficiency versus misalignments for two approximately 50% overlapping coils, centered at approximately X=0, in accordance with an exemplary embodiment of the present invention.
Figure 8B:
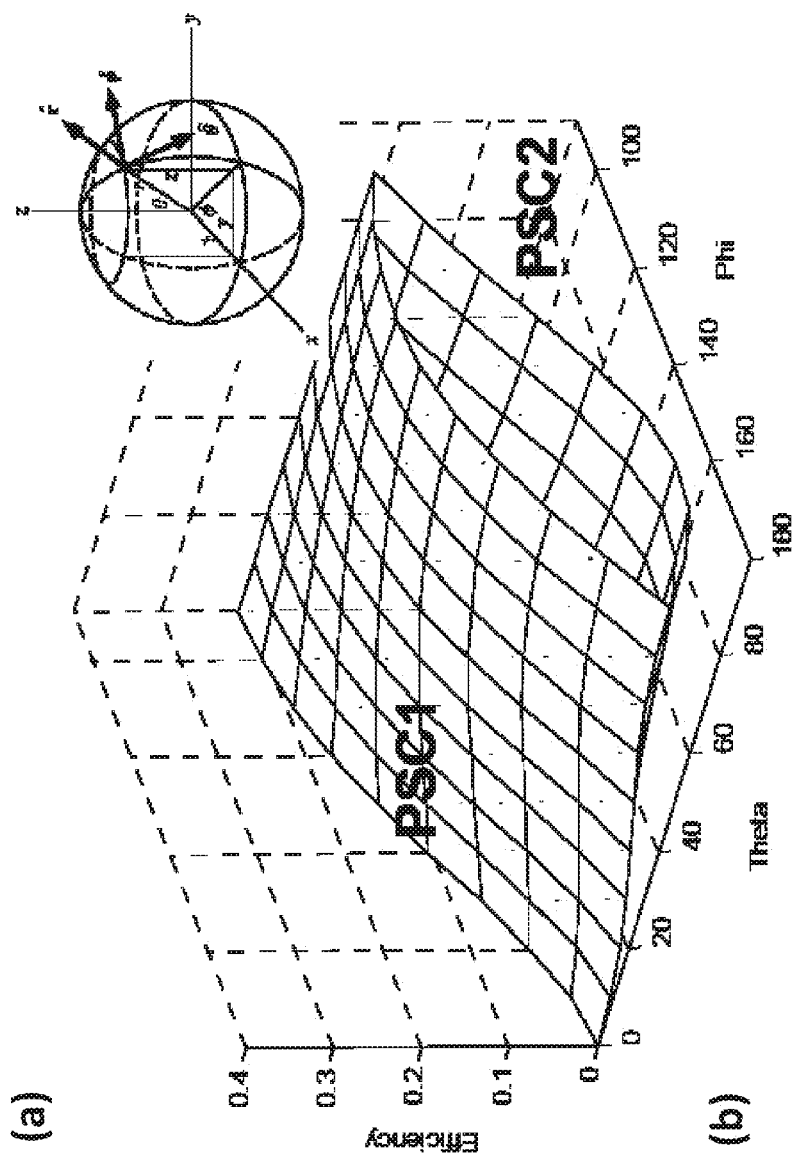
FIG. 8B illustrates a graphical representation of efficiency versus tilting for two approximately 50% overlapping coils, centered at approximately X=0, in accordance with an exemplary embodiment of the present invention.

For example, the optimization method was applied to an approximately two centimeter receiver coil held at an average height of approximately five centimeters above the PSC plane. In one simulation, the optimal PSC parameters found at approximately 13.56 MHz were: approximately Φ12 cm, 5 turns, approximately 20% fill factor, approximately 4.1 mm line width, and approximately 0.15 mm line spacing. FIG. 8A illustrates simulated power transmission efficiency (η) of the inductive link at three different heights (H=approximately 3, 5, and 7 cm) when two PSCs are 50% overlapping (see FIG. 4). It can be seen that if PSC1 (centered at the approximate origin) and PSC2 (centered at X at approximately 6 cm) are activated for 0<X<3 cm and 3 cm<X<6 cm misalignments, respectively, the worst case efficiency at (X=3 cm, H=7 cm) can be $\eta_{min} \approx 10\%$. This means that to receive 20 mW at the IPS output while considering a typical 90% efficiency for class-E power amplifier and 85% efficiency for the active rectifier, consumption is approximately 0.26 W in the PSC array, which is acceptable for such a system. The effects of the receiver coil tilting on $\eta_{min}$ (i.e., a worst case misalignment) are shown in FIG. 8B. To oppose these changes, a flux steering technique can be used by simultaneously driving two or more out-of-phase adjacent PSCs.

In an exemplary embodiment, a permanent magnet incorporated in the portable unit can be tracked by a sensor system of the stationary unit. As mentioned, in an exemplary embodiment, the sensor system can be an array of three-axial magnetic sensors. In one embodiment, a method of magnetic localization is presented. The method can accurately track three-dimensional tongue movements in the oral cavity, and utilizes this information to discern the intention of a user. The magnetic field variations due to movements of a small permanent magnetic tracer attached to the tongue are detected by an array of three-axial magneto-inductive sensors and wirelessly sent to the processing system. The tracer is modeled as a magnetic dipole, which position and orientation are estimated using population based algorithms. Simulation and experimental results using a three-dimensional robot with approximately 3 μm resolution illustrated that using this method with the tracer inside the mouth cavity can localize within approximately one millimeter and approximately 2° resolution in position and orientation, respectively, which is better than what is required for the system operation.

In an exemplary embodiment, the system can include a scalable array of overlapping square-shaped PSCs, which can be arranged in a way that they cover recording arenas much larger than what is possible with today's hardwired setups. This permits experiments to run for virtually unlimited time periods. The system can track a subject's motion in a three-dimensional space with high precision. For example, the system can track a headstage carried by a subject's head, including head orientation, in both open and closed spaces, and it allows using multiple subjects interacting in the same arena. These features along with the rich environment offered by a battery-less lightweight headstage that can be easily carried by small subjects can significantly improve the quality of recordings and the accuracy of a wide variety of neuroscience experiments.

The system 100 can be divided into the stationary unit 200, the portable unit 300, and the processing system 400, as shown in FIG. 1. In an exemplary embodiment, the stationary unit 200 can have a scalable modular architecture. These modules 205 can be interconnected at the bottom layer of a PCB via connectors between overlapping PSCs (see, e.g., FIG. 4), as well as a communication means, including for example a global serial bus that connects them to the processing system via a USB interface. This architecture can allow a plurality of modules 205, in one embodiment for example up to 256 modules or more, to operate in parallel. Module sizes can vary and can be increased or decreased as needed or desired. As a result, the stationary unit 200 can cover sizable recording arenas that can either be square or have many shapes, for example in the form of a maze.

The incomplete PSCs that do not fall outside the boundaries of the recording arena can form complete PSCs once two or four adjacent modules are interconnected (see FIG. 4). Each module 205 can also be equipped with a number, e.g., between 4 and 27, highly efficient modified class-E power amplifiers, one for driving each PSC (see FIG. 6). Each PSC driver can be controlled by a local microcontroller system that is connected to the global bus. Further, each module 205 can have a number, e.g., between 4 and 27, PNI or Honeywell 3-axial magnetic sensors, which can be equally spaced below the surface of the PCB on a square-shaped grid (dots in FIG. 4). Each sensor can have a built-in interface circuitry that can digitize and send the measured magnetic flux density in (X, Y, Z) axes to the local microcontroller system. The microcontroller system can enable or disable each PSC or magnetic sensor within that module, and also temporarily store the recorded magnetic field data in its internal memory as a buffer.

The microcontroller system can be connected to the global serial bus, and the bus connects all the modules to a USB interface chip, which oversees the data transfers between the modules and the central processing system. Alternatively, with the added benefit of being platform-independent (Windows/Mac/Linux), an Ethernet connection can be connected to the processing system through a field programmable gate array (FPGA). The processing system 400 can collect all the magnetic sensors' information, and run localization algorithms to indicate the position/orientation of the magnetic tracer in three-dimensions. The processing system 400 can then decide which PSC(s) are the closest to the portable unit 300, and activate them by sending commands to the particular modules that include those PSCs.

The processing system 400 can further receive feedback from the portable unit IPS, for example, either through back telemetry readout circuitry (similar to an RFID tag) or a separate wireless link. The feedback can adjust the amplitude of the class-E or other types of driver outputs, ensuring that the portable unit receives the correct amount of power, regardless of its position and orientation. If the received power is too low, the neural recording device may stop working, and if it is too high, it results in unnecessary heat dissipation. The closed loop feedback can help setting the PSC driver outputs at levels enough for the recording device to operate smoothly. The processing system can also run a GUI through which the user can set some of the adjustable parameters, and can also observe the status of the system. In an exemplary embodiment, depending on the complexity of the real-time neural signal processing, the same processing system can control the neural signal recording, processing, and visualization.

In an exemplary embodiment, the portable or mobile unit can be an inductive power supply (IPS) that can directly substitute batteries in many wireless devices, for example a WINeR or similar commercial devices, such as the neural headstage by TBSI or TeleSpike™ by Alpha Omega. A receiver coil of the portable unit can be wound around a permanent magnetic core that can play the role of a magnetic tracer. The magnetic core improves the coupling with the PSC array by increasing the magnetic flux density inside the receiver coil. It can also be combined with ferrite materials to enhance the coils coupling even further. The receiver coil can be followed by a power management system that can include a high efficiency full wave active or passive rectifier and a regulator. This power management system can also include protection circuitry, a storage capacitor, and a battery charger. The protection circuitry can protect the electronics of the portable unit against an instantaneous power surge that may happen if the subject moves its head very close to the active PSC in a sudden movement, before the feedback loop across the wireless link can react. The protection circuitry can continuously monitor the coil voltage and ultimately detune the receiver coil if the voltage exceeds a certain, safe limit.

Inclusion of an optional small, rechargeable battery can oppose a sudden reduction in the received power when the subject moves in a position such that the coil of the portable unit is no longer substantially parallel with the array coils of the stationary unit. For example, if the subject is a rodent having four legs, this occurs when it rears on its hindlimbs. From observations in rats, this may occur for a few seconds. In a familiar environment, rats stand on their hindlegs less frequently (e.g., once every five minutes) than in a brand new environment, where they might stand as much as once every twenty seconds. In some embodiments, the system may either include the storage capacitor (for example, a ripple rejection capacitor) to temporarily power the neural recording, a stimulation device without interruption, or a larger storage component, i.e. a rechargeable battery.

As illustrated in FIGS. 9A-9D, the magnetic field emitted by the stationary unit 200 can be substantially perpendicular relative to the coils of the stationary unit. In some embodiments, for optimal inductive power transmission, the portable unit 300 can be substantially parallel relative to the coils of the stationary unit, as depicted in FIGS. 9A-9D. In these figures, the magnetic field emitted by coils of the stationary unit travels through the secondary coils of the portable unit, and thus provides an inductive power source for charging and/or powering the portable unit.

In FIG. 9D, however, the portable unit 300 is not substantially parallel relative the coils of the stationary unit 200 and it may be desirable to change the magnetic field being emitted from the stationary base system. As shown in FIG. 9D, in some embodiments, the array of primary coils of the stationary unit 200 comprises a first coil in the substantially the same plane as a second coil, such that the first coil is positioned next to/near the second coil. When the secondary coil of the moving subject is no longer substantially parallel, e.g., is substantially perpendicular, to the array of coils of the stationary unit, i.e., to the plane of the first and second coils, the magnetic field of the first coil is between approximately 0 degrees and approximately 180 degrees out of phase of the magnetic field of the second coil. By placing the coils out of phase with one another, this causes in the magnetic flux generated by the first coil to be bent towards the second coil and pass through a winding of the second coil. Because the orientation of the portable unit is known, due to the magnetic tracer carried therein, by changing the phase of one of the primary coils relative to another coil, the emitted magnetic field can be transmitted in such direction to maximize the inductive power transfer. In an exemplary embodiment, the magnetic field transmitted towards the portable unit is preferably substantially perpendicular to its secondary coil(s).

In an exemplary embodiment, the weight of the portable unit comprises: coil wires (approximately 0.02 g)+magnet (approximately 0.33 g)+PCB (approximately 1 g)+IC chip and other SMD components (approximately 0.3 g) totaling approximately 1.65 g. This sum can be much less than the primary coin batteries, which on average store approximately 200 mAh and weigh approximately 5 g. With an approximate 6 mA current drain (approximately 18 mW), such batteries (e.g., CR2032) last for approximately a day and half, while the IPS can run for an unlimited period of time.

The control system can monitor the unregulated power (both voltage and current) at the output of the integrated rectifier, and send data to the processing system. Data can be transmitted back to the processing system, for example, through either back telemetry or ISM-band wireless link, in order to close the power control feedback loop. It can also interface with the other front-end blocks that can be supplied by the portable unit. For example, control commands can be received and delivered to the designated blocks through IPS. In a simplified implementation, however, a unidirectional ISM-band wireless link from IPS to the processing system can be implemented, by combining the measured power with the recorded neural signals, and sending them through the WINeR wireless transmitter. For commercial recording devices, because of lack of access to its internal transmitter, the IPS can have a transmitter operating at a different ISM-band frequency.

The system can allow us to apply various control strategies and compensation mechanisms to ensure high performance and stability of the power control loop in the digital domain. Considering the fastest possible rates of subject movements within the recording arena, a dual-core processing system can be sufficient for stable operation of the system. If more processing power or real multitasking is needed to minimize delays in the control loop, dedicated DSP hardware can be implemented.

To minimize the effects of abrupt magnetic field variations at the PSC boundaries, each PSC can have an approximate 50% overlap with four PSCs in cardinal directions and an approximate 25% overlap with four other PSCs in diagonal directions, as shown in FIG. 2. This arrangement fixes the horizontal distance between the headstage and the center of the closest PSC can to be approximately less than a quarter of the PSC diameter.

Example

The following is a non-limiting example of a system incorporating exemplary embodiments of the present invention.

Long-Evans rats, weighing between approximately 350-400 g, can be habituated to the arena and can then be trained to forage around the arena to find randomly scattered small pieces of chocolate. The purpose of training the rats to forage is to get them to sample the entire recording arena and to discourage them from remaining stationary. After the rats learn to forage for the randomly scattered pieces of chocolate, they can be implanted with a chronic recording headstage above either the ventral hippocampus (n=6; 5.8-6.3 mm posterior and 5.5-5.8 mm lateral to bregma) or dorsal hippocampus (n=6; 3.6 to 4.0 mm posterior and 2.2 to 2.7 mm lateral to bregma). The recording headstage can support the electronics described previously and can contain eight independently movable tetrodes. Each tetrode can be composed of four 12.5 µm nichrome wires whose tips can be plated with gold to bring the impedance to 200 kΩ at 1 kHz. Animals can be allowed to recover for 4 to 6 days, and the tetrodes can then be moved down slowly, over the course of 2 to 3 weeks, until the tips reach their target regions. The placement of the tetrode tips can be verified by several hippocampal pyramidal electrophysiological hallmarks (complex spikes, theta-modulated spiking, multi-unit bursts accompanied by 200 Hz "ripples" in the field potential), and later on by postmortem histology.

When cells are present on at least one tetrode, a two-hour recording session can be conducted in which the rats are allowed to freely move about the recording arena, while foraging for randomly scattered chocolate pieces. Ten novel junk objects can be placed in various locations in the arena during each recording session. At half hour intervals, the objects can be moved to new positions, such that each object can appear in four locations in one session. The purpose of moving the objects can be to allow distinguishing whether activity during object exploration reflects more strongly the object's location or the object's identity. Many previous studies have shown that rats can spontaneously inspect novel objects and can reinitiate exploration of those objects when they are moved. During testing, spike activity can be amplified, filtered (e.g., at approximately 600-6000 Hz), and saved for offline analysis. Head position and direction can be monitored using the magnetic tracking technology, and behavior can be recorded with high-res digital video (e.g., approximately 30 frames/sec), both of which can be synchronized with the acquisition of neural data (see FIG. 1). The precise head position and orientation tracking can be used to determine when a rat is inspecting an object (onset of inspection would be defined as the rat approaching within one centimeter of object location and exhibiting proper head orientation). The video can be used as a confirmation of the rat's position and exploration behavior as obtained by the magnetic position and direction monitoring. Data can be analyzed starting with an off-line isolation of individual units using software that allows for 3-D visualization of amplitude profiles across the four wires of a given tetrode (Offline Sorter, Plexon Inc., Dallas, Tex.).

The following table includes non-limiting quantities of features and specifications of an exemplary system of embodiments of the present invention.

TABLE I

EXEMPLARY SYSTEM SPECIFICATIONS

| Specification | Value |
| --- | --- |
| Printed Spiral Coils (PSC) (Stationary Unit) | |
| Overall dimensions | 3 m × 2 m or larger |
| Shape, PSCs/module | Rectangular spiral, 4-27 |
| Power carrier frequency | 13.56 MHz |
| Number of PCB layers | 4 or 6 |
| Sensors resolution and range | 0.015 µT/1100 µT |
| Sensor dimensions | 6.3 × 2.3 × 2.2 mm$^3$ |
| Sampling rate | 15 Hz |
| Wireless Intergrated Neural Recording Device (WINeR) | |
| Number of channels | 32 simultaneous |
| Carrier frequency | ISM-Band 900 MHz |
| Power consumption | ~6 mW at ±1.5 V |
| Portable Unit (e.g., Headstage for Rats) | |
| Coil dimensions | Ø 20 mm × 2 mm |
| Magnetic tracer | NdFeB, Ø 5 mm × 2 mm |
| Min/Average/Max distance | 0/5/10 cm |
| Estimated volume | Less than 1 cc |
| Estimated weight | Less than 2 g |
| Inductive Power Supply (IPS) | |
| Regulated output power | 20 mW |
| Output voltage | ±1.5 V or ±2.5 V |

In one aspect of the present invention, a wireless charging system for charging or powering inductively is provided. The system includes a stationary base system and a portable unit. The stationary base system comprises a primary coil system emitting a magnetic field. The portable unit is carried by a moving subject and comprises a secondary coil, wherein the secondary coil is inductively charged or powered by the magnetic field of the primary coil system.

In some embodiments, the primary coil system comprises an array of primary coils for generating the magnetic field. In some embodiments, the stationary base system further comprises a sensor system and the portable unit further comprising a tracer, wherein the sensor system is adapted to track the tracer. In some embodiments, the sensor system of the stationary base system communicates the location of the moving subject in proximity to the stationary base system. In some embodiments, the sensor system of the stationary base system communicates the location of the moving subject within a range of the stationary base system to a control system for activating a portion of the primary coil system of the stationary base unit. In some embodiments, the magnetic field emitted by the stationary base system is adapted to be emitted in substantially perpendicular direction relative the primary coil system.

In some embodiments, a predetermined number of coils of the array of primary coils emit the magnetic field in a substantially perpendicular direction relative the secondary coil of the portable unit. In some embodiments, the secondary coil of the portable unit is substantially parallel relative to the array of primary coils. In some embodiments, the system further includes a power supply for passing a current through a primary coil system. In some embodiments, the stationary base system further comprises a power amplifier system for controlling the amount of power to generate the magnetic field. In some embodiments, the stationary base system further comprises a control system to control and drive the primary coil system. In some embodiments, the sensor system of the stationary base system comprises a magnetic sensor, and the tracer of the portable unit comprises a magnet, wherein the magnetic sensor tracks the magnetic tracer of the portable unit. In some embodiments, the stationary base system further comprises a telemetry readout system for receiving data from the portable unit.

In some embodiments, the portable unit further comprises a control system for controlling a wireless transceiver. In some embodiments, portable unit can be carried by a living being and further comprises a transmitter to transmit data. In some embodiments, the array of primary coils comprises a first coil in the same plane as a second coil, such that the first coil is positioned next to the second coil, such that when the secondary coil of the moving subject is substantially perpendicular to the array of coils and to the plane of the first and second coils, the magnetic field of the first coil is between approximately 0 degrees and approximately 180 degrees out of phase of the magnetic field of the second coil, causing in the magnetic flux generated by the first coil to be bent towards the second coil and pass through a winding of the second coil.

In some embodiments, the portable unit is adapted to be implanted in the moving subject. In some embodiments, the portable unit further comprises a chargeable power source for powering the portable unit and adapted to be charged by the stationary base system.

In another aspect of the present invention, a system for simultaneously charging or powering a headstage is provided. The system includes a base unit comprising a plurality of primary coils having a generally planar shape, the primary coils adapted to generate magnetic fields in a substantially perpendicular direction to the plane of the primary coils; and a headstage system adapted to be carried by a living being and adapted to be inductively charged or powered by the magnetic fields emitted from the base unit, and comprising a secondary coil.

In some embodiments, the system can further include a rechargeable battery for powering the headstage system. In some embodiments, the substantially perpendicular magnetic fields can inductively generate a current in the secondary coil of the headstage system. In some embodiments, the secondary coil of the headstage is inductively charged and powered by the magnetic field of at least one of the primary coils.

In some embodiments, the headstage system further comprises a sensor system, and the headstage further comprises a magnet, wherein the magnet of the headstage is adapted to be tracked by the sensor system. In some embodiments, the headstage system moves in proximity to the base unit. In some embodiments, the sensor system communicates the location of the headstage system along a surface for activating a portion of predetermined coils within the plurality of primary coils. In some embodiments, the magnetic field emitted by a predetermined number of coils of the plurality of coils are adapted to be in a substantially perpendicular direction relative to the secondary coil of the dynamic element.

In some embodiments, the secondary coil of the headstage system is positioned substantially parallel relative to the plurality of primary coils. In some embodiments, the base unit further comprises a power amplifier system for controlling the amount of power to deliver to the primary coils and to generate the magnetic fields from the base unit to transfer power to the headstage system. In some embodiments, the base unit further comprises a control system to control and drive the plurality of primary coils. In some embodiments, the base unit further comprises a sensor system that includes a magnetic sensor, wherein the magnetic sensor tracks a magnetic tracer of the headstage system. In some embodiments, the base unit further comprises a telemetry readout system for receiving data directly from the headstage system. In some embodiments, the headstage system further comprises a magnetic tracer for indicating the location and orientation of the headstage system.

In some embodiments, the headstage system further comprises a control system for controlling a wireless transceiver. In some embodiments, the headstage system further comprises a transmitter to wirelessly transmit data to a processing system. In some embodiments, the plurality of primary coils comprises a first coil in the same plane as a second coil, wherein the first coil is positioned next to the second coil, and wherein when the secondary coil of the headstage system is substantially perpendicular to the array of coils and to the plane of the first and second coils, the magnetic field of the first coil is between approximately 0 degrees and approximately 180 degrees out of phase of the magnetic field of the second coil, causing the magnetic flux generated by the first coil to be bent towards the second coil and pass through the windings of the second coil.

In some embodiments, the system further comprises an optical recording system for recording the movement of the moving subject in proximity to the stationary base system.

While exemplary embodiments of the invention have been disclosed many modifications, additions, and deletions can be made therein without departing from the spirit and scope of the invention and its equivalents, as set forth in the following claims. In addition, the quantities of various features of embodiments of the present invention are provided for illustrated embodiments and are exemplary. The scope of the various embodiments of the present invention should not be limited to the above discussed embodiments or quantity values, and should only be defined by the following claims and all applicable equivalents.

What is claimed is:

1. A system for simultaneously charging or powering a headstage, the system comprising:
    a base unit comprising a plurality of coplanar primary coils, each of the primary coils having a planar shape, the primary coils adapted to generate magnetic fields in a perpendicular direction to the plane of the primary coils; and
    a headstage system adapted to be carried by a living being, the headstage system comprising a secondary coil and adapted to be inductively charged or powered by magnetic fields emitted from at least a portion of the plurality of primary coils of the base unit while the headstage system is being carried by a living being.

2. The system of claim 1, wherein the headstage system further comprises a tracer, and the base unit further comprising a sensor system adapted to track the location and orientation of the tracer.

3. The system of claim 2, the base unit configured to activate a portion of the plurality of primary coils in response to a location of the headstage system along a surface as detected by the sensor system, the portion of the plurality of primary coils being a predetermined number of fewer coils of the total number of primary coils.

4. The system of claim 3, wherein the portion of the plurality of primary coils are adapted to generate a magnetic field having magnetic flux lines that are substantially perpendicular to the secondary coil of the headstage system.

5. The system of claim 2, the sensor system comprising a magnetic sensor and the tracer comprising a magnetic tracer.

6. The system of claim 1, the headstage system further comprising a magnetic tracer for indicating the location and orientation of the headstage system.

7. The system of claim 1, the headstage system further comprising a transmitter to wirelessly transmit data to a processing system.

8. The system of claim 1 further comprising an optical recording system for recording movement of a living being carrying the headstage system along a surface of the base system.

9. The system of claim 1, wherein the base unit comprises a plurality of modules, each module comprising a printed spiral coil and a control system.

10. The system of claim 9, wherein a module of the plurality of modules further comprises two half printed spiral coils, and four quarter printed spiral coils.

11. The system of claim 9, wherein the base unit comprises two modules, and wherein each module contains a control system, and wherein the control systems of the two modules form a synchronous network.

12. The system of claim 1, wherein the primary coils are powered by a class-E amplifier, and wherein the class-E amplifier comprises a power switch in series with the primary coil that is closed when the primary coil is in an active state, and open when the primary coil is in an inactive state.

13. The system of claim 1, wherein the headstage system is a wireless neural recording headstage.

14. The system of claim 1, wherein an inductor is connected between a first primary coil in the plurality of coplanar primary coils and a second primary coil overlapping the first primary coil to create infinite impedance between the first primary coil and second primary coil.

15. The system of claim 1, wherein the base unit is adapted to receive feedback from the headstage system comprising the amount of power received by the headstage system, and wherein the base unit is adapted to adjust the amplitude of the magnetic fields generated by the primary coils such that the headstage system receives a predetermined amount of power.

16. The system of claim 1, wherein the headstage system further comprises an active full wave rectifier, a voltage regulator, and a storage capacitor.

17. The system of claim 2, wherein the tracer is a magnetic core of the secondary coil of the headstage system.

18. The system of claim 2, wherein the base unit is adapted to control an amplitude and a phase difference between a first coil and a second coil in the plurality of coplanar primary coils to steer magnetic field flux lines generated by the first and second coil toward the secondary coil when a change in orientation of the tracer is detected by the base unit.

* * * * *